July 3, 1951  G. G. NORRIS  2,559,042

FISH LURE

Filed Dec. 11, 1946

Inventor
George G. Norris
Barthel + Bugbee
Attorneys

Patented July 3, 1951

2,559,042

UNITED STATES PATENT OFFICE 2,559,042

FISH LURE

George G. Norris, River Rouge, Mich.

Application December 11, 1946, Serial No. 715,404

1 Claim. (Cl. 43—42.51)

This invention relates to fishing tackle and in particular to artificial fish lures.

One object of this invention is to provide an artificial fish lure which possesses an improved diving and darting action as it is drawn through the water.

Another object is to provide an artificial fish lure of the spoon type having one portion bent abruptly relatively to another portion and with diving fins at the end opposite the bent portion, this construction producing a vigorous darting and diving action simulating the natural darting of a fish.

Another object is to provide an artificial fish lure of the spoon type, as set forth in the preceding objects wherein the fins are located asymmetrically relatively to the axis of the lure.

Another object is to provide an artificial fish lure of the spoon type as set forth in the preceding objects, wherein the lure is approximately V-shaped in cross-section.

Other objects and advantages of the invention will become apparent during the course of the following description of the accompanying drawings, wherein.

Figure 1:
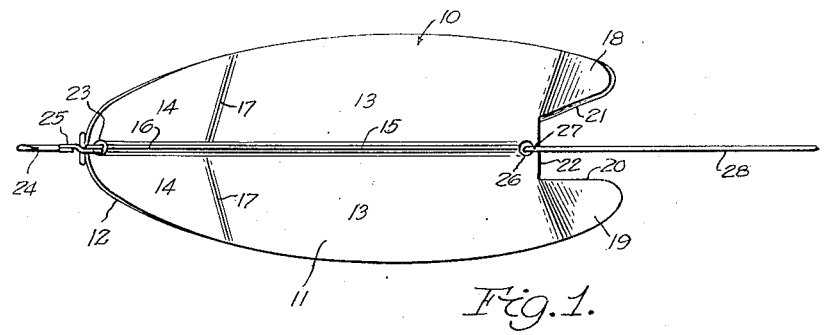
Figure 1 is a top plan view of an artificial fish lure according to a preferred form of the invention.
Figure 2:
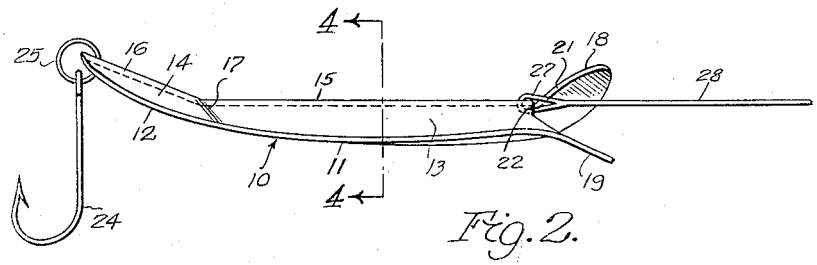
Figure 2 is a side elevation of the fish lure shown in Figure 1.
Figure 3:
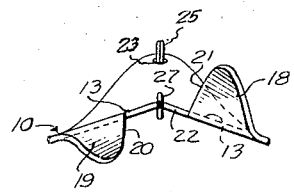
Figure 3 is a right-hand end elevation of the fish lure shown in Figures 1 and 2, showing the forward end of the lure.
Figure 4:
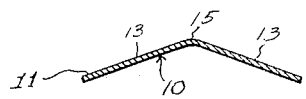
Figure 4 is a vertical cross section through the lure taken along the line 4—4 in Figure 2.

Referring to the drawings in detail, Figure 1 shows an artificial fish lure generally designated 10 of the spoon type according to a preferred form of the invention. The lure is made of thin sheet material, such as metal or plastic and has a central portion 11 and a rear end portion 12, both of approximately V-shaped cross-section with sides 13 and 14 bent longitudinally along bending lines 15 and 16 respectively. The end portion 12 is also bent abruptly along the transverse lines 17 relatively to the central portion 12. The rearward and central portions 12 and 11 are of approximately oval outline.

The central portion 11 terminates in oppositely bent fins 18 and 19 respectively with their inner edges 20 and 21 spaced apart from one another along a transverse edge 22. The edges 20 and 21 are asymmetrical with respect to the longitudinal axis of the lure, as represented by the longitudinal bending lines 15 and 16 which form in effect a ridge extending from end to end of the lure. In other words, the edge 21 is inclined or diverges laterally at a different angle to the longitudinal axis of the lure than the edge 20, in addition to being bent vertically in the opposite direction. Expressed in different language, the horizontal projection of the inner edge 20 of the fin 19 is approximately parallel to the longitudinal axis of the lure whereas the horizontal projection of the inner edge 21 of the fin 18 diverges outwardly away from said longitudinal axis, as is clearly seen in Figure 1.

The rearward end portion 12 of the lure 10 is provided with a hole 23 for the attachment of a suitable hook or hooks, for example a hook 24 attached by a split ring 25 passing through the hole 23. It will be obvious that in place of the single hook 24 shown in the drawing, a multiple hook or gang hooks in tandem can be employed where desired. The forward end of the lure 10 is similarly provided with a hole 26 adjacent the transverse edge 22 for the reception of the end 27 of a fishing line or leader 28. The opposite end of the member 28, if a leader, may be equipped with a conventional swivel (not shown).

In operation, the lure 10 may be used either in casting or by trolling, as desired. When the lure is drawn through the water by either method, it darts to and fro sidewise or oscillates and dives and ascends irregularly with a motion simulating that of a natural fish. In so moving, the lure 10 does not rotate like a conventional spoon, but usually oscillates to and fro sidewise with a rocking motion around its longitudinal axis as a center, with its ridges 15 and 16 remaining uppermost while it is darting, diving or ascending. The placing of the fin edges 20 and 21 at different angles to the longitudinal axis of the lure 10 imparts to it this irregular zigzag or darting motion to and fro as it moves along. When the fin edges are placed at the same angles, it is found that the lure merely rocks back and forth while it travels along a substantially straight path without darting to and fro on a zigzag path. The lure may be drawn through the water with either end foremost, but is preferably drawn with the fins 18 and 19 foremost. If, however, the fishing line or leader 28 is attached to the hole 23, the hook 24 is of course attached to the hole 26.

The fishing lure of this invention has been found very effective in catching northern pike and bass, but is also efficient in catching other types of game fish. The body of the lure may be decorated with various colors as desired, it being shown of a single color for the sake of simplicity.

While I have shown and described my invention in detail, it is to be understood that the same is to be limited only by the appended claim, for many changes may be made without departing from the spirit and scope of my invention.

What I claim is:

An artificial fish lure comprising a relatively thin sheet-like body having an end portion bent obliquely relatively to the intermediate portion thereof, hook means connected to one end of said body, and oppositely-bent longitudinally-extending fins at the end remote from said bent end portion, one of said fins having its inner edge diverging outward relatively to the longitudinal axis of said body and the other fin having the horizontal projection of its inner edge substantially parallel to said longitudinal axis.

GEORGE G. NORRIS.

REFERENCES CITED

The following references are of record in the file of this patent:

UNITED STATES PATENTS

| Number | Name | Date |
| --- | --- | --- |
| 967,660 | Pedersen | Aug. 16, 1910 |
| 1,599,747 | Dills | Sept. 14, 1926 |
| 1,943,283 | Beil | Jan. 16, 1934 |
| 2,305,117 | Swanson | Dec. 15, 1942 |
| 2,375,290 | Docteur | May 8, 1945 |